United States Patent [19]
Osawa et al.

[11] Patent Number: 5,293,795
[45] Date of Patent: Mar. 15, 1994

[54] METHOD AND APPARATUS FOR CUTTING AND SHAPING BELT-LIKE MEMBERS

[75] Inventors: Masayuki Osawa; Shunichi Inoue, both of Kodaira, Japan

[73] Assignee: Bridgestone Corporation, Tokyo, Japan

[21] Appl. No.: 15,292

[22] Filed: Feb. 8, 1993

Related U.S. Application Data

[63] Continuation of Ser. No. 805,050, Dec. 11, 1991, abandoned.

[30] Foreign Application Priority Data

Dec. 21, 1990 [JP]  Japan .................................. 2-412614

[51] Int. Cl.⁵ .............................................. B26D 7/10
[52] U.S. Cl. .......................................... 83/16; 83/129; 83/171; 83/315; 83/628; 264/163
[58] Field of Search ................... 83/16, 171, 951, 928, 83/129, 130, 315; 264/160, 163

[56] References Cited

U.S. PATENT DOCUMENTS

| | | | |
|---|---|---|---|
| 2,042,829 | 6/1936 | Carlin | 83/171 |
| 3,613,490 | 10/1971 | Bredow | 83/552 X |
| 3,732,767 | 5/1973 | Habert | 83/171 |
| 3,922,939 | 12/1975 | Schlueter et al. | 83/315 X |
| 4,069,727 | 1/1978 | Sparks et al. | 83/16 |
| 4,279,183 | 7/1981 | LaFleur | 83/16 |
| 4,426,901 | 1/1984 | Hogan et al. | 83/875 X |
| 4,516,451 | 5/1985 | Takeshita et al. | 83/171 |

FOREIGN PATENT DOCUMENTS 59-55734  3/1984  Japan .................... B29H 17/00

Primary Examiner—Richard K. Seidel
Assistant Examiner—Kenneth E. Peterson
Attorney, Agent, or Firm—Sughrue, Mion, Zinn, Macpeak & Seas

[57] ABSTRACT

At a cut end portion of a belt-like member is formed a jointing surface, which is inclined at a small angle with respect to the surface of the belt-like member, simultaneously with cutting. A belt-like member (32) on a conveyor belt (6) is pinched under a pressure by an upper die (29) and a lower die (33) heated respectively by heaters (30) and (34), thereby it is subjected to plastic deformation and cut, and also jointing inclined surfaces are formed at the cut end portions. A die holding member (24) for holding the upper die is reciprocated in the vertical direction, by an action of a rotary shaft (11) having an eccentric cam (18). A separating member (38) which is moved vertically by another cam (40) operates as delayed with respect to the movement of the upper die, and when the upper die leaves the belt-like member, it presses the belt-like member to insure separation of the die.

16 Claims, 7 Drawing Sheets

FIG. 7
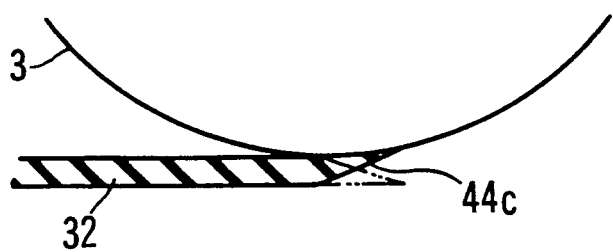
FIG. 8A   FIG. 8B   FIG. 8C
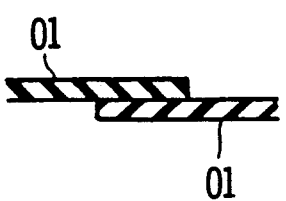  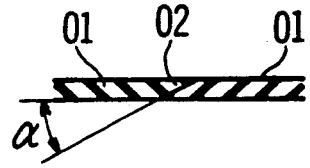

METHOD AND APPARATUS FOR CUTTING AND SHAPING BELT-LIKE MEMBERS

This is a continuation of application Ser. No. 07/805,050 filed Dec. 11, 1991, now abandoned.

BACKGROUND OF THE INVENTION

1. Field of the Invention

The present invention relates to a method and an apparatus for cutting a raw material belt-like member to obtain desired product belt-like members and also forming inclined surfaces for jointing at the cut end portions of the product belt-like members, for instance, upon manufacture of tires.

2. Description of the Prior Art

W the manufacture of tires, a raw material belt-like member made of unvulcanized rubber is cut to obtain belt-like members having a predetermined length, and steps of wrapping this belt-like member around a drum having a circumferential length equal to the length of the belt-like member with its opposite ends jointed together and press-jointing the both end portions, are carried out.

Generally, in the case of jointing the opposite end portions of a belt-like member 01 or end portions of two belt-like members 01, 01, lap joint in which end portions are in themselves overlapped as shown in FIG. 8A, is frequently used, but in this lap joint a thickness of a jointed portion becomes twice as thick as that of the other portion, hence an inner structure is varied due to volume change of that portion, and it would adversely affect the product Especially in the case of manufacturing a tire, the above-mentioned volume change would adversely affect uniformity and balance of the tire.

In addition, butt joint as shown in FIG. 8B is also employed, but this butt joint is technically accompanied by difficulties as a jointing method at the time of forming a thin belt-like member of unvulcanized rubber into a cylindrical shape, and especially in the case of a tire, since the belt-like member is subjected to various external forces and deformation before completion, the butt joint is not suitable in view of a mechanical strength.

In FIG. 8C is shown taper joint, wherein taper-shaped inclined surfaces 02 are formed at the end portions to be jointed with each other and the opposite end portions are jointed together via these inclined surfaces. With this taper joint, a volume change would not occur as is the case with the above-described lap joint. Also a jointing surface area becomes broad as compared to the above-described butt joint, and a jointing force is increased by the corresponding amount. However, in the prior art, since the inclined surface 02 was formed by cutting the belt-like member 01 obliquely with respect to the direction of thickness by means of a cutter, an inclination angle could not be made a small angle of, for instance, 20° or less. There is thus a limit in the increase of a jointing surface area and a jointing force. In addition, since the inclination angle α is large, even if the end portions should deviate a little, poor jointing portions such as steps or vacancies (opened) or the like would be liable to occur, hence in order to remedy such poor jointing portions so that the jointing portions may not adversely affect the performance after the belt-like members had been matured into a product tire, surplus man-hours were necessitated in the next step of the process.

SUMMARY OF THE INVENTION

It is therefore one object of the present invention to provide a method and an apparatus for cutting and shaping belt-like members wherein jointing inclined surfaces tilting at a small angle with respect to the surface of the above-mentioned belt-like members can be formed at the cut end portions of the belt-like members simultaneously with cutting.

According to one feature of the present invention, there is provided a method for cutting and shaping belt-like members, wherein a raw material belt-like member is cut to obtain desired product belt-like members and also jointing inclined surfaces at a predetermined angle are formed at the cut end portions of the product belt-like members. The method comprises a positioning conveying step wherein the raw material belt-like member is conveyed to position its portion intended to be cut at a position of a die having a die surface of the shape corresponding to the jointing inclined surface, a die heating step wherein the die is heated, a cutting and shaping step wherein the die is pressed against the raw material belt-like member in its thicknesswise direction to cut the raw material belt-like material and also form the jointing inclined surfaces at the cut end portions, a die separating step wherein the die and the belt-like members are separated from each other, and a conveying step wherein the product belt-like member cut out from the raw material belt-like material is conveyed and taken out.

According to another feature of the present invention, there is provided an apparatus for cutting and shaping belt-like members, wherein a raw material belt-like member is cut to obtain a desired product belt-like members and also jointing inclined surfaces at a predetermined angle are formed at the cut end portion of the product belt-like members. The apparatus comprises a die having a die surface of the shape corresponding to the jointing inclined surfaces, heater means for heating the die, belt-like member conveyor means for conveying the raw material belt-like member as passing the die, die press means for pressing the die against the surface of the raw material belt-like material, and die separator means for separating the die and the belt-like members from each other.

According to the present invention, as a result of the fact that the die heated in the die heating step is pressed against the portion intended to be cut of the raw material belt-like member in the cutting and shaping step, that portion of the raw material belt-like member is subjected to plastic deformation and it is cut. At the same time, the cut portions are shaped as pressed by the die surface, and jointing inclined surfaces tilting at a predetermined angle are formed at the cut end portions Since the jointing inclined surfaces are shaped by plastic working in the above-described manner, a jointing inclined surface having a small tilt angle can be formed easily. Accordingly, even in the case of a thin belt-like member, a joint portion wherein the members are strongly jointed via a broad jointing surface, can be formed.

In the case where product belt-like members are successively cut out from a raw material belt-like member, a jointing inclined surface at the trailing end of a preceding belt-like member and a jointing inclined surface at the leading end of a succeeding belt-like member are formed simultaneously by the above-mentioned die. Accordingly, since the belt-like member taken out through the conveying step has the above-described jointing inclined surfaces formed respectively at its leading end and at its trailing end, if this belt-like member is subsequently wrapped around a shaping drum, the leading end and the trailing end can be jointed extremely smoothly and strongly via a broad jointing inclined surface at a small tilt angle. It is to be noted that since at this time at least the jointing inclined surface at the trailing end is still maintained at a relatively high temperature as a result of shaping by the heated die, extremely good adhesive jointing can be realized.

Especially, if the method according to the present invention is employed in the manufacture of a tire, a remarkable improvement effect can be obtained in the uniformity and balance as well as the appearance of the manufactured tire. In addition, even if a member adjacent to the belt-like member wrapped around a shaping drum is a cord-reinforced rubber sheet, when they have been formed into a tire, the distribution of intervals of the cord arrangement in the cord reinforced rubber sheet adjacent to the joint portion is reduced, because steps and vacancies are not present in the joint portion.

The method according to the present invention can be effectively practiced by making use of the apparatus according to the present invention, which comprises a die having a die surface of the shape corresponding to the above-mentioned jointing inclined surfaces, heater means for heating the aforementioned die, belt-like member conveyor means for conveying the raw material belt-like member as passing the die, die press means for pressing the above-mentioned die against the surface of the raw material belt-like member, and die separator means for separating the die and the belt-like member from each other.

The above-mentioned and other objects, features and advantages of the present invention will be become apparent by reference to the following description of preferred embodiments of the invention taken in conjunction with the accompanying drawings.

BRIEF DESCRIPTION OF THE DRAWINGS

In the accompanying drawings:

FIG. 7 is a schematic view showing the state where a leading end of a belt-like member begins to wrap around a shaping drum; and FIGS. 8A, 8B, and 8C are cross-section views showing different types of a jointing portion of belt-like members in the prior art.

DESCRIPTION OF THE PREFERRED EMBODIMENTS

Figure 1:
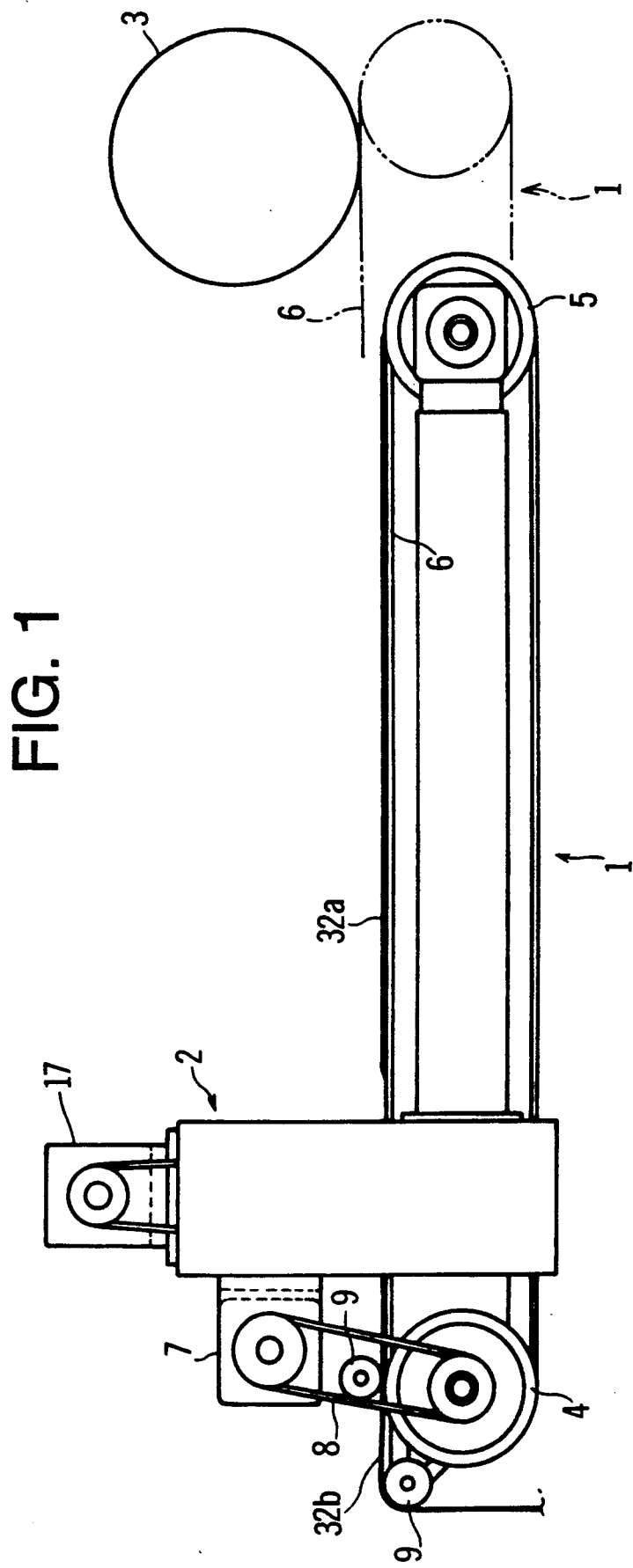
FIG. 1 is a general side view of a belt-like member cutting and shaping apparatus according to one preferred embodiment of the invention.
Figure 2:
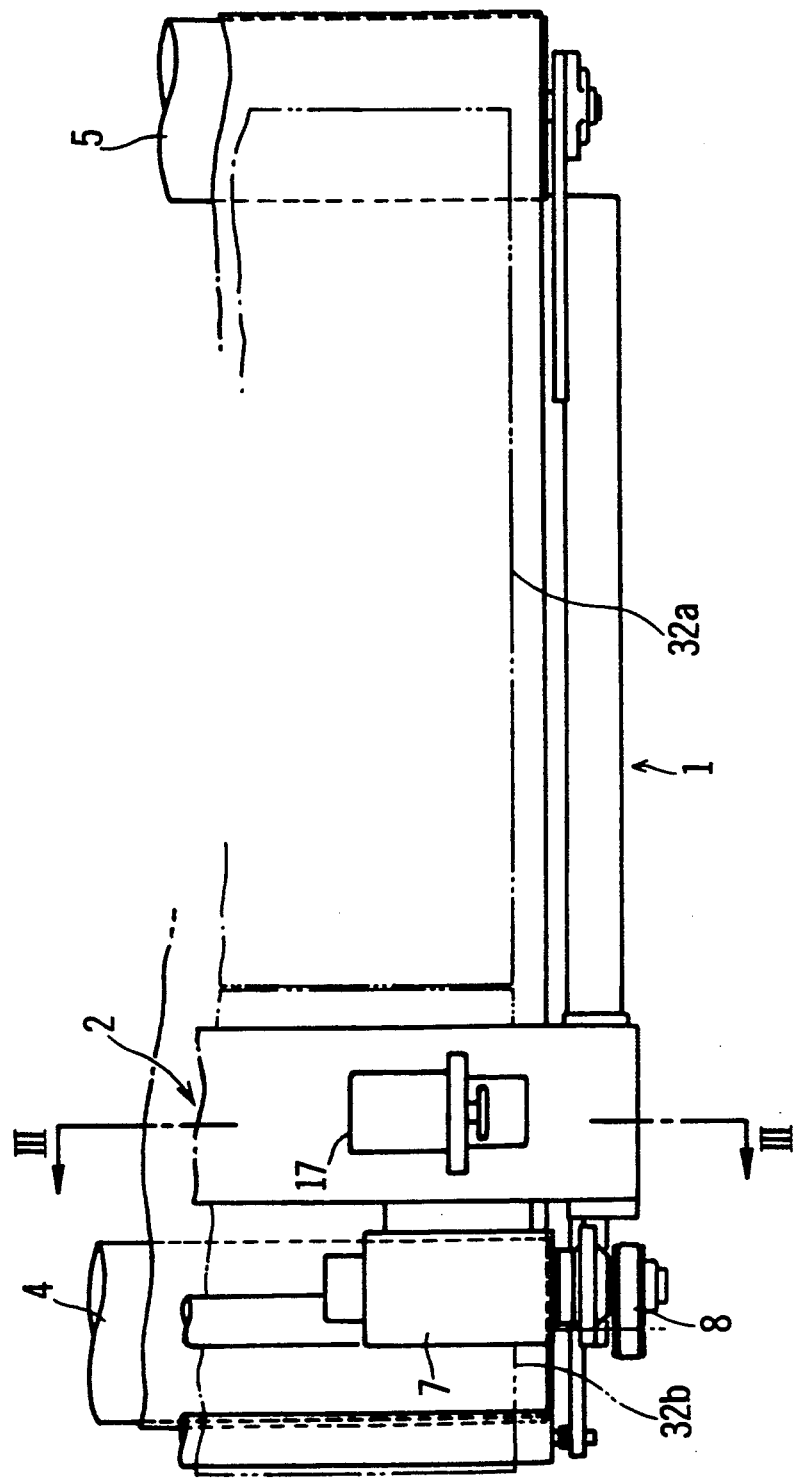
FIG. 2 is a partial top view of the same apparatus.

FIG. 1 is a general side view of a belt-like member cutting and shaping apparatus according to one preferred embodiment of the present invention, and FIG. 2 is a partial top view of the same apparatus. This apparatus is an apparatus to be used for cutting a raw material belt-like member made of unvulcanized rubber to cut out a belt-like member having a predetermined length, wrapping this belt-like member around a shaping drum and jointing the opposite ends thereof in a tire manufacturing process. The apparatus is composed of a conveyor 1, a cutting and shaping station 2 provided in the midway of the conveyor 1, and a shaping drum 3 disposed above and in front of the conveyor 1.

The conveyor 1 is a belt conveyor, in which a conveyor belt 6 is wrapped around and stretched between a drive pulley 4 at its rear end and a driven pulley 5 at its front end, the drive pulley 4 is driven via a drive belt 8 by a drive motor 7 fixedly provided at the cutting and shaping station 2, and thereby an upper traveling section of the conveyor belt 6 travels forwards. It is to be noted that the conveyor belt 6 travels while passing through the cutting and shaping station 2. A raw material belt-like member 32 is fed onto the conveyor belt 6 from the rear side, that is, the side of the drive pulley 4 as guided by a guide roller 9, and it is conveyed forward by the conveyor belt 6. And at the position where the belt-like member has been conveyed by a predetermined distance, it is cut within the cutting and shaping station 2 by means of a cutting and shaping mechanism, which will be described later, contained within the same station 2, and thereby a belt-like member 32a having a predetermined length is cut out from the succeeding raw material belt-like member portion 32b.

Subsequently, the conveyor belt 6 comes into contact with the shaping drum 3 as a result of the fact that the conveyor 1 moves forward as a whole jointly with the cutting and shaping station 2 and also the conveyor 1 inclines with its end moved upwards as shown by broken lines 1 in FIG. 1. If necessary, the raw material belt-like member portion 32b is separated from the surface of the conveyor belt 6, and under this condition, if the conveyor belt 6 is driven, then the belt-like member 32a cut out of the above-mentioned raw material belt-like member is conveyed by the conveyor belt 6. When it has reached the shaping drum 3, the belt-like member 32a transfers to the side of the shaping drum 3 and is wrapped around the circumferential surface of the drum. The shaping drum 3 is rotationally driven at the same linear velocity as the conveyor belt 6. When the leading end and the trailing end of the belt-like member 32a have overlapped with each other at the contact position between the shaping drum 3 and the conveyor belt 6, they are adhesively jointed with each other by a pressing force between the shaping drum and the conveyor belt 6.

Figure 3:
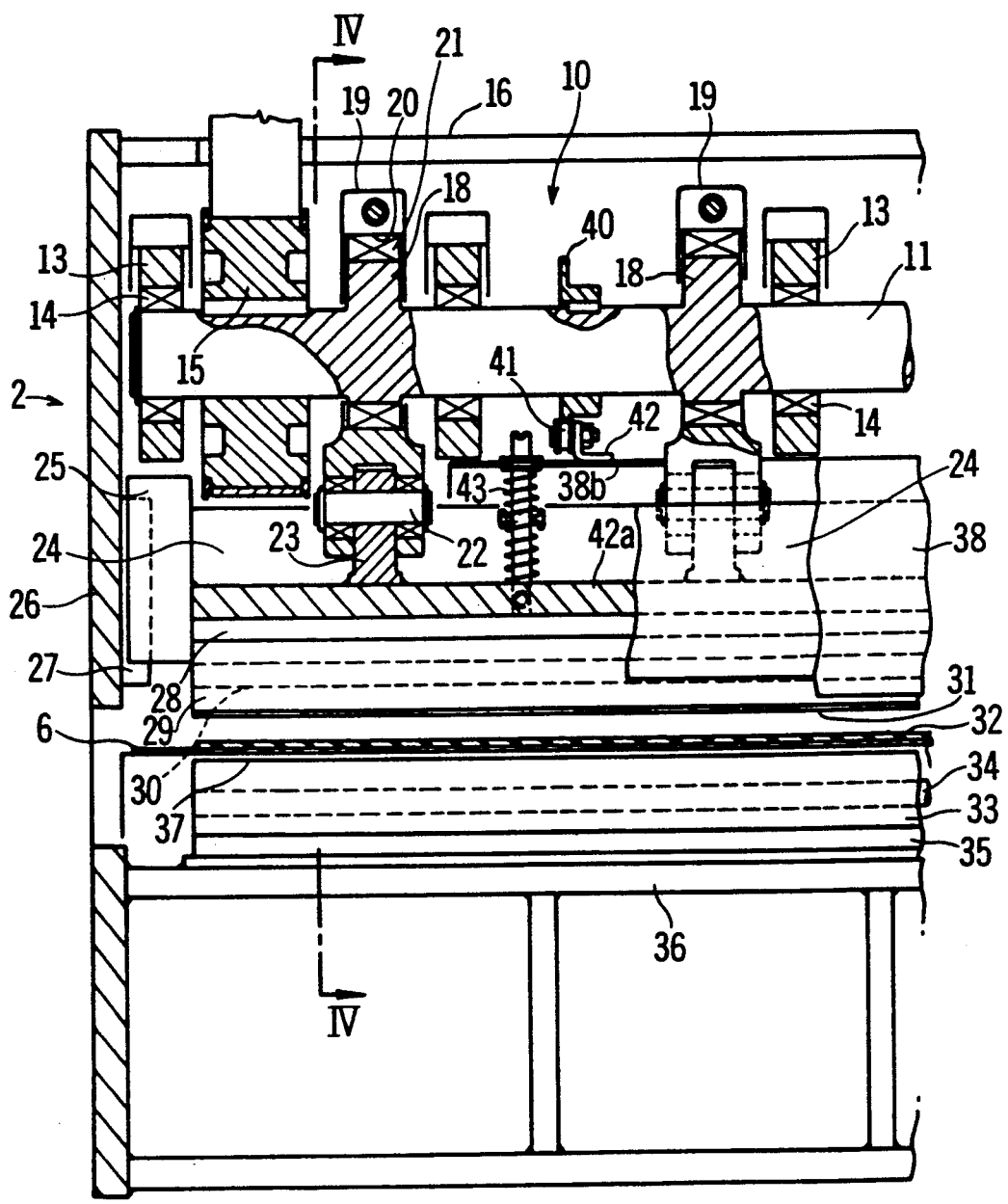
FIG. 3 is a cross-section view taken along line III—III in FIG. 2.
Figure 4:
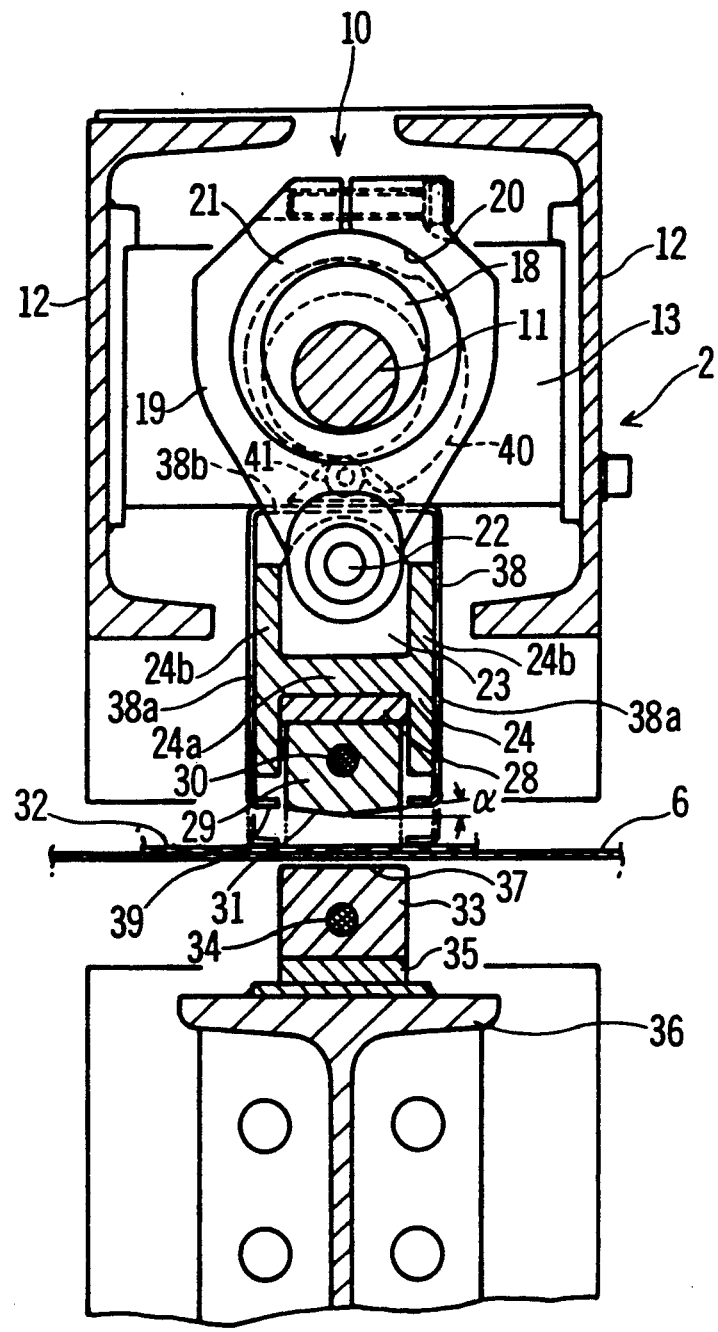
FIG. 4 is a cross-section view taken along line IV—IV in FIG. 3.

FIGS. 3 and 4 are illustrations showing a cutting and shaping mechanism 10 provided within the above-mentioned cutting and shaping station 2, FIG. 3 is a cross-section view taken along line III—III in FIG. 2, and FIG. 4 is another cross-section view taken along line IV—IV in FIG. 3.

As will be seen from these figures, within the cutting and shaping station 2 is disposed one rotary shaft 11 extending above the conveyor belt 6 in the widthwise direction thereof. This rotary shaft 11 is rotatably supported via bearings 14 from partition wall members 13 connecting front and rear wall members 12, 12 of the cutting and shaping station 2. Reference numeral 15 designates a driven pulley fixedly secured to the rotary shaft 11. It is driven via a belt by a drive motor 17 (See FIGS. 1 and 2) supported on the top wall 16 of the cutting and shaping station 2 to rotationally drive the rotary shaft 11.

On the rotary shaft 11 are also fixedly provided a plurality of eccentric cams 18 integrally therewith at a predetermined interval in the lengthwise direction, and a follower member 19 is fitted around each eccentric cam 18 to be relatively rotatable. More particularly, a circular hole 20 provided in the follower member 19 is concentric with the eccentric cam 18, and a bearing 21 is fitted and inserted between the inner circumferential surface of the circular hole 20 and the outer circumferential surface of the eccentric cam 18. A lower portion of the follower member 19 is forked, and a shaft 22 extending in the widthwise direction of the conveyor belt 6 is pivotably mounted to the follower member 19 penetrating through the respective forked portions. A connecting piece 23 is fitted to this shaft 22 at the inside of the above-mentioned forked portions and extends downwards, and its bottom end is secured to a die holding member 24 by welding.

The die holding member 24 has an H-shaped cross-section configuration as shown in FIG. 4. Also it extends long in the widthwise direction of the conveyor belt 6 from one side portion up to the other side portion. The above-described connecting piece 23 is secured by welding to a web 24a of this die holding member 24. At the end portions of front and rear side pieces 24b, 24b are respectively provided planar slide plates 25 projecting therefrom as directed in the direction at right angles to the conveyor belt 6. These slide plates 25 are sandwiched on their outside, between guide plates 27 projected from a side wall 26 of the cutting and shaping station 2 and held in slide contact with these guide plates 27. Accordingly, the die holding member 24 is restrained so as to be movable only in the direction at right angles to the conveyor belt 6, that is, only in the vertical direction.

On the lower surface of the web piece 24a of the die holding member 24 is fixedly secured and held an upper die 29 via a heat-insulating plate 28. This upper die 29 also extends in the widthwise direction along the die holding member 24 from one side portion up to the other side portion, and has a heater 30 assembled therein. The type of the heater 30 is arbitrary, and it could be, for instance, of the type of circulating thermal medium or of electric heater type. The lower surface of the upper die 29 is shaped into a die surface inclined at a predetermined angle α in the opposite directions at the portions in front of and behind the center line position. This angle α is an angle corresponding to a tilting angle of the jointing inclined surfaces to be formed at the cut end portions when a belt-like member 32 made of unvulcanized rubber on the conveyor belt 6 is cut in the manner as will be described later, and it is a small angle of 20° or less, for instance, about 5°. The above-described heater 30 heats this die surface 31 up to a temperature at which the belt-like member 32 presents thermal plasticity, that is, about 100° and preferably 70° to 100°.

Under the upper die 29, a lower die 33 is disposed as opposed to the upper die 29 with the conveyor belt 6 placed therebetween. The lower die 33 also extends in the widthwise direction, and a heater 34 similar to the above-described heater 30 is assembled within the lower die 33. However, the top surface of the lower die 33 is formed into a flat die surface 37. This lower die 33 is fixed to a base 36 via a heat-insulating plate 35. Since the heat-insulating plate 28 and the heat-insulating plate 35 are interposed respectively between the upper die 29 and the holding member 24 and between the lower die 33 and the base 36, heat generated by the heaters 30 and 34 are solely transmitted to the die surfaces 31 and 37 and efficiently heats these die surfaces.

A box-shaped separating member 38 having its bottom surface opened, is provided on the outside of the die holding member 24 so as to surround the latter, and the both front and rear side walls 38a of the above-mentioned separating member 38 are held in slide contact with the outer surfaces of the side pieces 24b of the die holding member 24. The lower edges of the both side walls 38a of the separating member 38 are respectively bent inwards and form pressing pieces 39. On the other hand, a cam 40 which is different from the above-mentioned eccentric cam 18 is fixed to the rotary shaft 11, and a cam follower 41 adapted to respond to this cam 40 is mounted via a bracket 42 to an upper wall 38b of the separating member 38. Since the separating member 38 is biased upwards by means of a spring 43, the cam follower 41 is always engaged with the cam surface of the cam 40.

When the rotary shaft 11 turns, the follower member 19 fitting to the eccentric cam would move up and down while swinging back and forth about the shaft 22, in response to this vertical movement, the die holding member 24 performs reciprocating motion in the vertical direction as guided by the guide plates 27. On the other hand the separating member 38 also performs reciprocating motion in the vertical direction as driven by the cam 40, and the direction of eccentricity of the eccentric cam 18 and the cam surface configuration of the cam 40 are preset in such manner that a predetermined phase relation may be maintained between the reciprocating motion of the die holding member 24 and the reciprocating motion of the separating member 38. As a result, when the die holding member 24 descends, the separating member 38 starts to descend as delaying with respect to the die holding member 24, and after the die holding member 24 reaches the lowermost point, the separating member also reaches the lowermost point as indicated by broken lines in FIG. 4. When the die holding member 24 ascends from the lowermost point also, the separating member 38 starts to ascend as delaying with respect to the die holding member 24.

Figure 5:
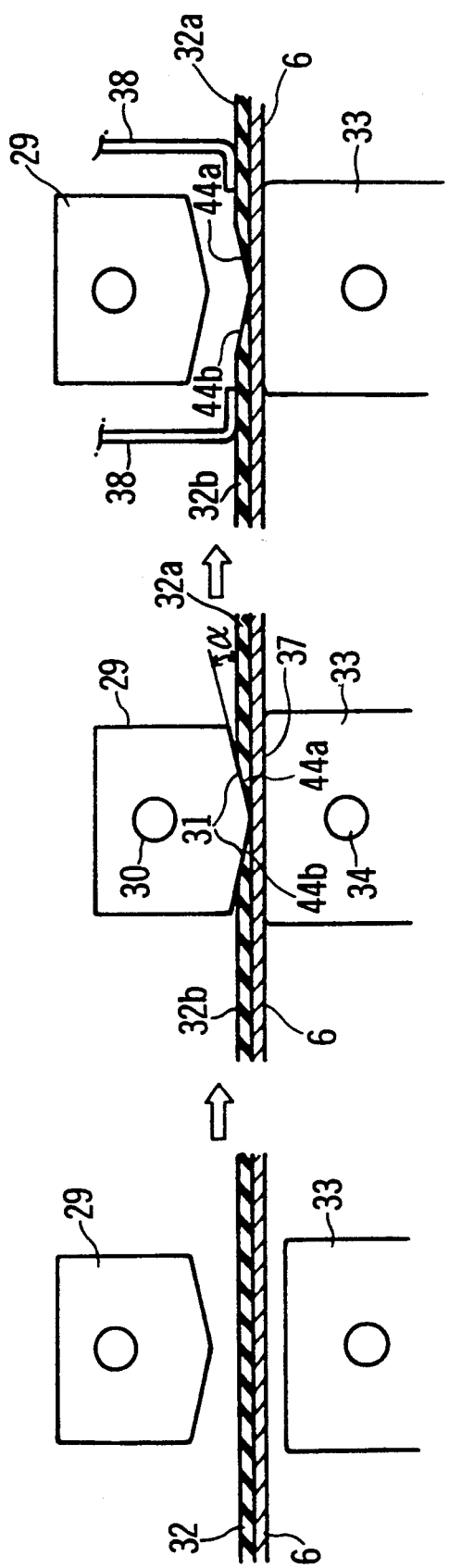
FIG. 5 is a schematic view showing the successive steps in the process of cutting and shaping belt-like members.

Now, before explaining the process of cutting and shaping belt-like members 32 by means of the apparatus according to the present invention in the following, at first it is assumed that a raw material belt-like member 32 having its leading end cut and shaped into a predetermined configuration by a preceding operation, is set on the conveyor belt 6 with the above-mentioned leading end positioned under the upper die 29. At this time, the upper die 29 and the separating member 38 are present at the ascended position as shown in FIG. 4. Starting from this condition, the raw material belt-like member 32 is conveyed by a predetermined length (a length of the product belt-like member intended to obtain) by driving the conveyor belt 6, and then the conveyor belt 6 is stopped (See the left side portion of FIG. 5). Subsequently, if the rotary shaft 11 is rotated, at first the upper die 29 descends and comes into contact with the belt-like member 32, and it presses the belt-like member 32 against the die surface 37 of the lower die 33 jointly with the conveyor belt 6 (See the central portion of FIG. 5). Since the die surfaces 31 and 37 have been heated by the heaters 30 and 34, respectively, the portion of the belt-like member 32 held in contact with the die surface 31 is plasticized by the heat transmitted from the die surfaces 31 and 37, and is shaped similarly to the die surface 31 by the pressure applied by the both dies 29 and 33. Also it is cut into a product belt-like member 32a and a raw material belt-like member 32b. On the product belt-like member 32a and the raw material belt-like member 32b are respectively formed jointing inclined surface 44a and 44b by the die surface 31. The jointing inclined surface 44a becomes a jointing inclined surface at the trailing end of the product belt-like member 32a, and the jointing inclined surface 44b becomes a jointing inclined surface at the leading end of product belt-like member cut out next from the raw material belt-like member 32b. In this way, jointing inclined surfaces having a small tilting angle α and a broad jointing surface area can be formed extremely easily and reliably at the opposite ends of the product belt-like member by plastic working by means of the dies 29 and 33. It is to be noted that since the material of the conveyor belt 6 is appropriately selected from Teflon, steel, silicone group material and the like, and material not influenced by heat transmitted from the dies 29 and 33 is chosen, only the belt-like material 32 is cut and shaped.

During the period when the belt-like member 32 is cut and shaped by the upper die 29, the separating member 38 descends, and the belt-like member 32 is pressed against the conveyor belt 6 by the pressing pieces 39. While the upper die 29 ascends subsequently, since the state where the separating member 38 presses the belt-like member 32 is maintained, it would never occur that the belt-like member 32 sticks to the die 29 and ascends jointly with the upper die 29, but the belt-like member 32 can be separated from the upper die 29 very smoothly (See the right side portion of FIG. 5).

At the time when the separating member 38 also has ascended in succession, the drive of the rotary shaft 11 is stopped, and under the condition where the succeeding raw material belt-like member portion 32b has been separated from the surface of the conveyor belt 6, the belt-like member 32a is conveyed to the shaping drum 3 by driving the conveyor belt 6, it is wrapped around the shaping drum 3. On this shaping drum 3 the jointing inclined surfaces at the leading end and at the trailing end are overlapped on each other and jointed together. When the leading end of the belt-like member 32 begins to wrap around the circumferential surface of the shaping drum 3, the above-mentioned leading end shaped as shown by dash lines in FIG. 7 is deformed as shown by solid lines in FIG. 7 by the pinching pressure between the shaping drum 3 and the conveyor belt 6 and sticks to the circumferential surface of the shaping drum 3. As a result the surface on the opposite side to the surface shaped by the upper die 29 becomes a jointing inclined surface 44c having the same tilting angle, hence the jointing inclined surface 44a at the trailing end (See FIG. 5) in itself overlaps on this jointing inclined surface 44c, thus they are press jointed by the shaping drum 3 and the conveyor belt 6, and a smooth joint portion, in which a jointing surface is broad and a thickness is not varied, can be obtained. In addition, the trailing end jointing inclined surface 44a is still maintained at a high-temperature condition because time has not yet elapsed so much after the surface 44a was heated by the dies 29 and 33, and accordingly, a better joint can be obtained.

Figure 6:
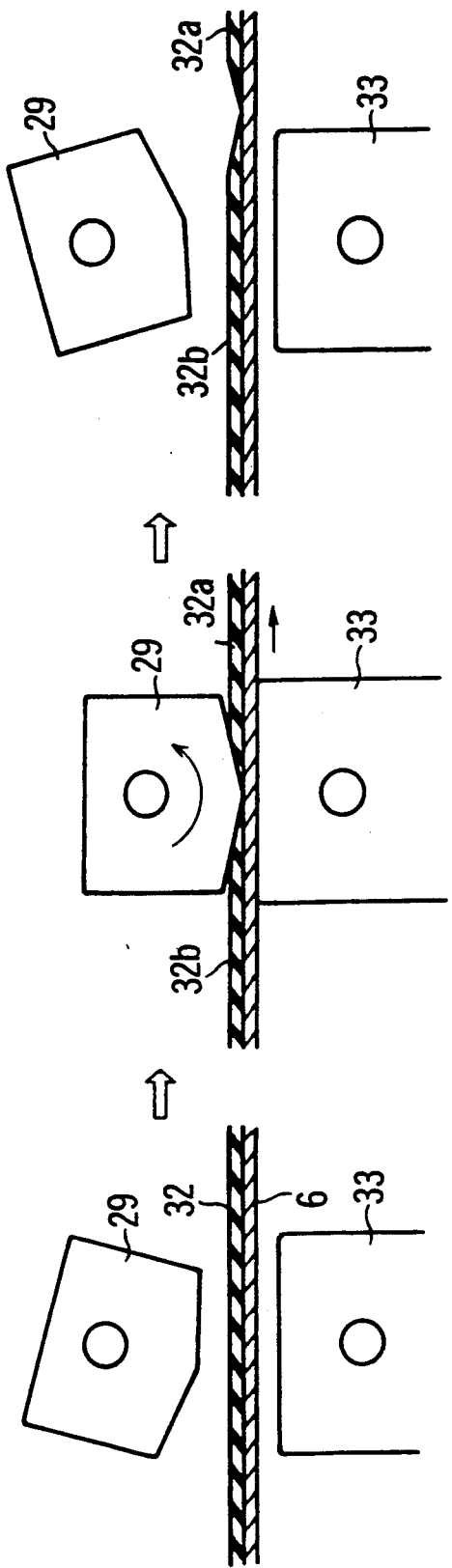
FIG. 6 is a schematic view similar to FIG. 5 but showing another preferred embodiment of the present invention.

While a description has been made above on one preferred embodiment of the present invention, it is a matter of course that the present invention should not be limited to this preferred embodiment, but many other modifications can be made. For instance, while the belt-like member 32 was cut and shaped under a stopped condition in the above-described preferred embodiment, in place of this mode of operation, it is also possible that as shown in FIG. 6, the upper die 29 is made to swing back and forth as synchronized with the conveying velocity of the belt-like member 32 so that the upper die 29 may be engaged with the belt-like member 32 when it has swung up to the lowermost position as shown at the center of FIG. 6. The upper die 29 cuts and shapes the belt-like member 32 while the swinging is continued as synchronized with the movement of the belt-like member 32. In addition, while the upper die 29 was moved vertically in the above-described preferred embodiment, it is also possible to modify the structure so that the lower die may be moved, and furthermore, it is also possible to modify so that both the upper die and the lower die may be moved. Furthermore, while an endless conveyor belt 6 was employed as belt-like member conveying means in the above-described preferred embodiment, in place of such means, for instance, gripping conveyor means which conveys a belt-like member while nipping an end portion thereof, could be employed.

As described above, according to the present invention, since jointing inclined surfaces of a belt-like member are formed by plastic working by means of dies, jointing inclined surfaces having a small tilting angle can be formed easily, and accordingly, even in the case of a thin belt-like member, a joint portion in which the belt-like members are strongly jointed via a broad jointing surface area, can be produced. Also a volume change at the joint portion is small, and especially, if the present invention is applied to manufacture of tires, a remarkable improvement effect can be obtained in the uniformity and balance of the product tire or in its appearance. Moreover, in the case when the belt-like member has been wrapped around a shaping drum, and the member adjacent to that belt-like member is a cord-reinforced rubber sheet, since a step and vacancies are eliminated in the joint portion of that belt-like member, when the belt-like member has been formed into a tire, distribution of the interval of the cords arrayed in the cord-reinforced rubber sheet adjacent to this joint portion can be reduced.

While a principle of the present invention has been described above in connection to preferred embodiments of the invention, it is intended that all matter contained in the above description and illustrated in the accompanying limiting sense.

What is claimed is:

1. A method for cutting and shaping belt-like members, wherein a raw material belt-like member is cut to obtain desired product belt-like members and also jointing inclined surfaces at a predetermined angle are formed at the cut end portions of said product belt-like members, said method comprising:

a positioning conveying step including conveying said raw material belt-like member to position its portion intended to be cut at a position of a die having a die surface of the shape corresponding to said jointing inclined surfaces, said die surface being opposite to a face of said raw material belt-like member, extending in a widthwise direction of said raw material belt-like member and being inclined with respect to said face in a lengthwise direction of said raw material belt-like member;

a die heating step including heating said die to a temperature at which said raw material belt-like member exhibits thermal plasticity;

a cutting and shaping step wherein said die is pressed against said raw material belt-like member perpendicularly to said face to cut said raw material belt-like member and also to form said jointing inclined surfaces at the cut end portions;

a die separating step including separating said die and said belt-like members from each other; and a conveying step including conveying the product belt-like member cut out from said raw material belt-like member to be taken out, wherein said die surface is inclined at an angle of approximately 20° or less with respect to said face.

2. A method for cutting and shaping belt-like members as claimed in claim 1, wherein during said cutting and shaping step, said raw material belt-like member is held stopped.

3. A method for cutting and shaping belt-like members as claimed in claim 1, wherein during said cutting and shaping step, said raw material belt-like member is moved.

4. A method for cutting and shaping belt-like members as claimed in claim 1, wherein said die surface comprises a first inclined surface at a portion in a position at a first direction from a center line of said die surface and a second inclined surface at a portion in a position at a second direction from said center line, said first direction being opposite to said second direction, said first and second inclined surfaces intersecting with each other along said center line.

5. A method for cutting and shaping belt-like members as claimed in claim 1, wherein said die presses said raw material belt-like member against another die having a flat die surface.

6. A method for cutting and shaping belt-like members as claimed in claim 1, wherein said raw material belt-like member is conveyed by a conveyor belt and said die presses said raw material belt-like member and said conveyor belt against another die having a flat die surface.

7. A method for cutting and shaping belt-like members as claimed in claim 1, wherein said raw material belt-like member is made of unvulcanized rubber.

8. An apparatus for cutting and shaping belt-like members, wherein a raw material belt-like member is cut to obtain desired product belt-like members and jointing inclined surfaces at a predetermined angle are formed at cut end portions of said product belt-like members, said apparatus comprising:

a first die including a die surface having a shape corresponding to said jointing inclined surfaces;

a second die for cooperating with said first die for cutting and shaping said raw material belt-like member;

means for conveying said raw material belt-like member past said first die, said die surface being opposite to a face of said raw material belt-like member, extending in a widthwise direction of said raw material belt-like member and being inclined with respect to said face in a lengthwise direction of said raw material belt-like member;

means for heating said first die;

means for pressing said first die against said raw material belt-like member perpendicularly to said face; and means for separating said first die and said belt-like members from each other, wherein said die surface comprises a first inclined surface at a portion in a first direction from a centerline of said die surface and a second inclined surface at a portion in a second direction from said centerline, said first and second inclined surfaces intersecting with each other along said centerline, said first and second inclined surfaces being inclined at an angle of no more than approximately 20° with respect to said face.

9. A method for cutting and shaping belt-like members, wherein a raw material belt-like member is cut to obtain desired product belt-like members and jointing inclined surfaces at a predetermined angle are formed at cut end portions of said product belt-like members, said method comprising:

positioning a first die opposite to a face of said raw material belt-like member so as to extend in a widthwise direction of said raw material belt-like member, said first die including a die surface having a shape corresponding to said jointing inclined surfaces and being inclined with respect to said face in a lengthwise direction of said raw material belt-like member;

conveying said raw material belt-like member past said first die;

heating said first die;

pressing said first die against said raw material belt-like member perpendicularly to said face, said first die cooperating with a second die for cutting and shaping said raw material belt-like member; and separating said first die and said belt-like members from each other, wherein said die surface comprises a first inclined surface at a portion in a first direction from a centerline of said die surface and a second inclined surface at a portion in a second direction from said centerline, said first and second inclined surfaces intersecting with each other along said centerline, said first and second inclined surfaces being inclined at an angle of no more than approximately 20° with respect to said face.

10. An apparatus for cutting and shaping belt-like members, wherein a raw material belt-like member is cut to obtain desired product belt-like members and also jointing inclined surfaces at a predetermined angle are formed at the cut end portions of said product belt-like members; characterized in that said apparatus comprises a die having a die surface of the shape corresponding to said jointing inclined surfaces, belt-like member conveyor means for conveying said raw material belt-like member past said die, said die surface being opposite to a face of said raw material belt-like member, extending in a widthwise direction of said raw material belt-like member and being inclined with respect to said face in a lengthwise direction of said raw material belt-like member, heater means for heating said die, die press means for pressing said die against said raw material belt-like member perpendicularly to said face, and die separator means for separating said die and said belt-like members from each other, wherein said die surface is inclined at an angle of approximately 20° or less with respect to said face.

11. An apparatus for cutting and shaping belt-like members as claimed in claim 10, wherein said die press means is composed of a rotary shaft integrally provided with an eccentric cam, a follower member fitted to said eccentric cam concentrically and in a relatively rotatable manner, a die holding member pivotably supported from said follower member for holding said die, and a guide member for guiding said holding member and restricting the direction of movement of said die holding member to a direction perpendicular to the surface of said belt-like member.

12. An apparatus for cutting and shaping belt-like members as claimed in claim 11, wherein said die separator means is formed of a separating member which moves in the direction perpendicular to the surface of said belt-like member while being delayed with respect to the movement said die holding member as driven by another cam provided on said rotary shaft, and which is engaged with the surface of the belt-like member when said die retreats from said surface and separates the belt-like member from said die.

13. An apparatus for cutting and shaping belt-like members as claimed in claim 10, wherein said die swings synchronized with a conveying velocity of said raw material belt-like member while cutting and shaping the belt-like member.

14. An apparatus for cutting and shaping belt-like members as claimed in claim 10, wherein said die surface comprises a first inclined surface at a portion in in a position at a first direction from a center line of said die surface and a second inclined surface at a portion in a position at a second direction from said center line, said first direction being opposite to said second direction, said first and second inclined surfaces intersecting with each other along said center line.

15. An apparatus for cutting and shaping belt-like members as claimed in claim 10, further comprising another die which cooperates with said die for cutting and shaping the belt-like member.

16. An apparatus for cutting and shaping belt-like members as claimed in claim 10, wherein said belt-like member conveying means comprises a conveyor belt, and said die being positioned on one side of said conveyor belt, and another die cooperating with said die and having a flat die surface is positioned on another side of said conveyor belt.

* * * * *